Nov. 4, 1969   G. STEINBACH   3,475,967
MEASURING DEVICE FOR TESTING THE CONTENT OF FLUID
CONTAINERS, IN PARTICULAR FUEL TANKS
Filed Oct. 31, 1966
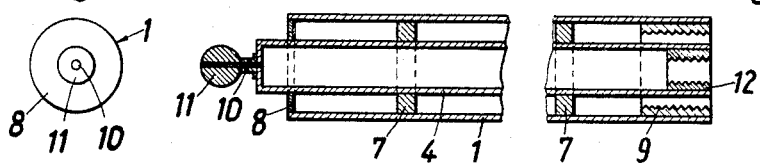
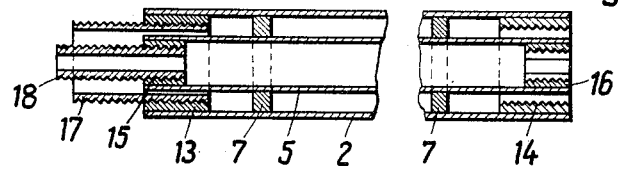
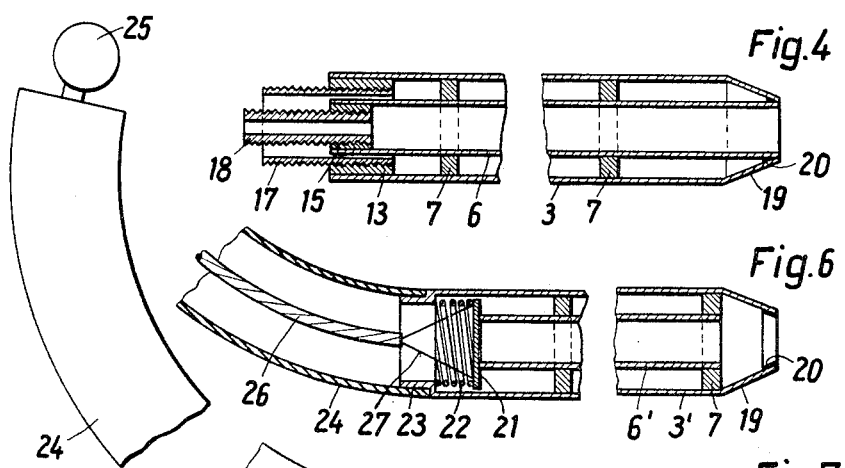
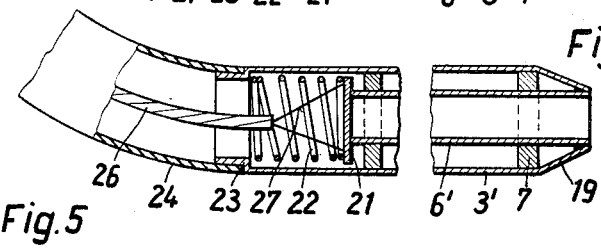
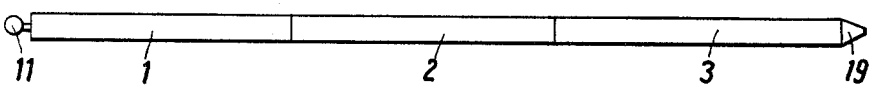
Inventor:
Gerhard Steinbach
by Jacob L. Hollin
ATTORNEY

United States Patent Office 3,475,967
Patented Nov. 4, 1969

3,475,967
MEASURING DEVICE FOR TESTING THE CONTENT OF FLUID CONTAINERS, IN PARTICULAR FUEL TANKS
Gerhard Steinbach, Stockacher Str. 173,
Tuttlingen, Germany
Filed Oct. 31, 1966, Ser. No. 590,942
Claims priority, application Germany, Oct. 29, 1965,
St 24,573
Int. Cl. G01n 1/10; G01f 23/04
U.S. Cl. 73—425.4                          8 Claims

ABSTRACT OF THE DISCLOSURE

A measuring and sampling probe having an inside tube that forms a seal at the lower end of the probe with an outside tube. Testing is performed by inserting the unsealed probe into the material, causing the inside tube to seal with the outside tube and removing the probe with the sampled material between the inside and outside tubes. The outside tube of the probe is constructed of transparent material to allow the different strata of the sampled material to be measured.

---

The invention relates to a measuring device constructed in the form of a probe and which serves to test the content of liquid containers. In performing such a test not only is the measurement of the liquid level and thus the volume of the fluid in the container effected, but above all there are tested the type and amount of the foreign particles contained in the liquid. In particular, in connection with fuel containers, such as tanks in gasoline stations and oil heat installations, it is important to ascertain the degree of contamination by oil sludge, condensed water and metallic particles, metallic oxides and other metal compounds which settle due to the corrosion of the container walls. Interruptions, damage and accidents can be obviated, depending on the timely determination of the time when a thorough cleaning of the tank must take place before re-filling the latter.

There are already known fluid probes of different types as well as probes with double tubes such as disclosed in German Patents Nos. 840,607, 860,868, 871,841, 873,309 as well as the published German specification No. 1,019,836; these probes serve however only for the determination of the liquid level, and they are not adapted thus for the determination and measurement of the contamination of fluid containers.

The object of the invention is to provide a measuring device which is of simple construction and serves the above described purpose. The measuring device according to the invention consists of an outer tube provided with an inner seal at its lower end and of an inner tube displaceable in the former and surrounded by the seal of the outer tube in its lowest position. To determine the condition or the height and kind of the contaminating or contaminated fluid portion, the outer tube, open on the bottom, and then the inner tube can be introduced carefully one after the other in the fluid container so that both tubes are initially filled. The inner tube seals, in its lowest position the outer tube. The same can also be accomplished by inserting both tubes together in the fluid container while at first the inner tube is held in a lifted position and is only let down when the outer tube is rested on the bottom of the container.

As soon as the both tubes have reached the bottom of the container they are lifted out together. The liquid in the inner tube flows out and the liquid contained in the space between both tubes can now be tested and its amount can be measured.

The outer tube may be constructed at its end in cylindrical form and may contain a circular seal for the inner tube. According to an advantageous embodiment of the invention, the lower end of the outer tube extends as a hollow cone-like sealing lip elastically enclosing the inner tube in its lowest position.

Since the liquid containers to be tested are partly deep and above all are of varying depths, the measuring device according to the invention comprises several tightly sealable outer tubes which may be screwed into one another and similarly securable inner tubes.

Normally, particularly when it is desired to determine the total content of the liquid containers, the arrangement is such that the uppermost portion of the inner tube close to an opening extends through a recess of the closing wall of the upper outer tube portion and is provided with a handle grip bored in longitudinal direction.

The device according to the invention can not be used further when the space above the measuring station makes it impossible to introduce a longer assembled set of tubes. In this case which occurs, for example, in connection with tanks of heating installation in cellars, it is proposed, according to the invention, to employ a substantially shortened embodiment. According to this latter, the upper tube is provided at its upper end with a pressure spring which is mounted between the end portion of this tube and a flange portion of the shortened inner tube, and the flange portion is then connected with a hand operated Bowden wire.

With extremely close space proportions and when it is necessary, above all, to examine and measure the lower dirt and sludge layer, it suffices to employ a device consisting only of an outer tension spring and end cone and only one inner tube with a flange portion and a Bowden wire.

In order to simplify the servicing of the instruments according to the invention the upper outer tube or the single outer tube may be equipped with a clamp or fastening with which the upper inner tube or the Bowden wire connected with the single inner tube may be held up when the instrument is inserted in the liquid container.

In order to provide an exact return inflow at a slow pace, to determine the condition of the contaminated liquid layer, into the lower end of both tubes, the instrument is inserted with the inner tube held up and is lifted after such a careful and slow lowering. Here it is important to prevent a false result which may be caused by a liquid flowing in from above. According to a further development of the invention, the upper end of the uppermost outer tube or the upper end of the single outer tube is constructed with a check valve which prevents the inflow of the liquid from above, for example, a ball type check valve.

The same purpose is served by the provision of a Bowden wire in a flexible tube in particular in a tube which is included in the upper portion of the outer tube and secured thereto in a liquid-tight manner.

The invention will be described, by way of example in connection with the drawing.

In the drawing:
FIG. 1 is a portion of the upper end tube in longitudinal section,
FIG. 2 is a plan view of the upper end portion with the actuating button shown partially,
FIG. 3 is an intermediate tube portion in longitudinal section,
FIG. 4 is a lower end portion of the tube in longitudinal section,
FIG. 5 illustrates, in side elevation, several assembled tube sections,
FIG. 6 shows the lower tube end section and the upper end tube section with a hose insert and a Bowden wire in open position and FIG. 7 the same section in closed position.

The liquid probe according to the embodiment of FIGS. 1–4 comprises an upper end tube 1, consisting of a transparent or translucent material such as glass or plastic, an intermediate tube 2 connected in a threaded manner therewith and a threadedly connected end tube 3. Three similarly connected tubes 4, 5 and 6 which are formed as a sealed tube are movably mounted inside the tubes 1–3 which together form a measuring tube. The sealing tube 4, 5, 6 is guided inside the measuring tube 1, 2, 3 through a ring 7 connected therewith, in a loose manner, having recesses.

The upper end of the upper end tube 1 comprises a closing wall 8 which surrounds or encloses the upper extending end of the upper sealing tube 4 with air. At the lower end of the upper end tube 1 there is inserted a sleeve 9 of transparent plastic material, and is rigidly secured to said end by welding, and is provided with an inner thread. The closing wall 8 of the upper sealing tube 4 has an opening 10 and is connected with a hand grip 11 having a longitudinal hollow. Just as in the upper measuring tube 1, there is provided at the lower end of the upper sealing tube 4 a sleeve 12 of transparent plastic attached by welding in a similar manner and provided with inner thread.

A pair of inwardly threaded sleeves 13, 14 are inserted in both ends of the outer intermediate tube 2 and sleeves 15, 16 with inner threads are inserted in the inner intermediate tube 5. Threaded pieces 17, 18 are screwed in the upper sleeves 13 and 15 during the screwing and their threads correspond with the inner threads of the sleeves 13, 16.

The lower outer end tube 3 and the lower inner end tube 6 are provided at their upper ends with similar sleeves 13, 14 and 15, 16 and threaded pieces 17, 18, just as the upper ends of the intermediate tubes 2 and 5.

The inner lower end tube 6 terminates at its lower portion as a cylindrical shape, while the outer lower end tube 3 has at its bottom portion a conical insert 19 which surrounds the inner lower end tube 6 in its deepest or lowest position. In order to attain a particularly good seal, the insert 19 is constructed as a sealing lip 20.

The threaded pieces 17 are calculated in such a manner that a free circular space remains between these and the inner tubes 4, 5 and 6, while the threaded pieces 18 and the guide rings 7 are provided with bores. The circular spaces and the bores makes it posible, on the one hand, to communicate the circular spaces formed between the outer tubes 1, 2, 3 and the inner tubes 4, 5, 6, and on the other hand the inner spaces in the inner tubes 4, 5, 6.

When required, the three above described tube sections are screwed together as shown in FIG. 5. With a greater depth of a container additional intermediate tubes, 2, 5 may be introduced. With a smaller depth of a container, the upper end tubes 1, 4 may be also screwed together directly with the lower end tubes.

Under certain conditions a longer tube section may be used instead of the pair of end tube sections, said longer tube section having an inner tube and an outer tube with top sections according to FIG. 1 and bottom portions according to FIG. 3.

Should the opening of the liquid container not be directly accessible, the construction according to FIGS. 6 and 7 may be used.

In this construction, in a manner similar to that of FIG. 4, an outer tube 3 with an insert 19 and an inner tube 6 are displaceably mounted in one another. Here the inner tube 6 is provided at its upper end with a spacer flange 21 for a pressure spring 22, which abuts with its other end against an upper end 23 of the outer tube 3. This end is constructed as a tube insert on which is secured an hose 24. A Bowden control cable 26 with an actuating button 25 is guided in this hose 24 which is rigidly secured, by means of an intermediate member 27 with the spacer flange 21 of the inner tube 6. The inner tube 6 is moved into the open position by pulling the Bowden control cable 26, as shown in FIG. 6, while releasing the Bowden control cable 26 causes the inner tube 6 to move into a closed position, under the action of spring 25.

I claim:

1. Measuring instrument for testing the content of liquid containers, particularly of gasoline tanks and the like, comprising in combination an outer imperforate transparent tube having a closed top provided with a circular opening and an open bottom portion, a hollow elastic sealing conical lip element secured in the bottom portion of said outer tube, guide rings secured in said outer tube at spaced intervals, said guide rings having recesses therein for the passage of liquid therethrough, an inner tube member displaceable axially in said outer tube through said guide rings, said inner tube having a lower end portion engageable with said elastic sealing cone element in sealing manner, when said inner tube member is displaced to its lowermost position in said outer tube.

2. Measuring instrument according to claim 1, further provided with a hose section secured to the upper end of the outer tube in liquid tight manner, a Bowden control cable extending through said opening in the top of said outer tube, said inner tube being shorter than said outer tube, a flange secured to the top of said inner member, one end of said cable secured to said flange, a helical spring interposed between said flange and said top of the outer tube said helical spring normally biasing the lower portion of said inner tube in sealing engagement with said elastic conical lip element.

3. Measuring instrument according to claim 1, wherein the uppermost section of the inner tube member extends through said opening in the top of said outer tube and is provided with a hand grip.

4. Measuring instrument according to claim 1, wherein the bottom portion of said outer tube member is a conical portion and said inner tube member is a single section.

5. Measuring instrument according to claim 1, wherein the upper portion of the outer tube member is further provided with clamping means for holding the inner tube member in raised position during the insertion of the measuring instrument into a liquid container.

6. Measuring instrument according to claim 1, wherein the closed end of the outer tube member is provided with check valve means for preventing the inflow of the liquid from above said outer tube member.

7. Measuring instrument according to claim 1, wherein said outer tube and said inner tube, respectively, comprise a plurality of threaded sections and means securing said threaded sections to one another.

8. Measuring instrument according to claim 7, wherein said means securing said threaded sections are a plurality of inwardly threaded sleeves, each of said sleeves securing a pair of threaded section ends.

References Cited

UNITED STATES PATENTS

| | | | |
|---|---|---|---|
| 1,739,731 | 12/1929 | Osborne | 73—290 XR |
| 2,544,262 | 3/1951 | Hall | 33—126.4 |

LOUIS R. PRINCE, Primary Examiner

H. C. POTTS III, Assistant Examiner

U.S. Cl. X.R.

33—126.4